Patented Apr. 24, 1928.

1,667,480

UNITED STATES PATENT OFFICE.

VAMAN R. KOKATNUR, OF NEW YORK, N. Y.

ALKALI FUSION.

No Drawing.　　Application filed January 22, 1926. Serial No. 83,136.

The present invention relates to improvements in alkali fusions of organic substances, such as beta-amino-anthraquinone, benzanthrone, anthraquinone-beta-sulfonic acid, benzene sulphonic acid, naphthalene sulphonic acids, chlor-benzanthrone, diamino-anthraquinone and other alkali fusions wherein an aromatic radical of an organic compound is reacted upon.

This application is a continuation in part of my prior application Ser. No. 476,326, filed June 9, 1921, and a continuation in part of my prior application Ser. No. 526,993, filed Jan. 4, 1922.

In the past it has been common to carry out certain alkali fusions in an aqueous bath, but in those fusions to which my invention applies this is disadvantageous so I employ only substantially anhydrous fusions.

Certain fusions have also been suggested wherein the organic body was fused in the presence of an inert diluent as for example that suggested in Michel German Patent No. 232,986, but in this case the aliphatic radical $CH_3COOH$, was reacted upon liberating $CO_2$, a reaction of a different class from that wherein aromatic radicals (such as $C_6H_5NH_2$) are reacted upon in the alkali fusion.

It has also been suggested that certain aromatic radicals may be reacted upon in alkali fusions in the presence of certain organic diluents, but in all such cases, so far as I am aware, as well as in the process described in said Michel patent, the amount of caustic alkali employed has been many times in excess of the amount required by theory for the reaction. According to my invention an aromatic body or chain or nucleus (all of which I include by the term aromatic radical) is reacted upon instead of an aliphatic body or chain or nucleus. Thus my invention may be applied to compounds partly aliphatic and partly aromatic where the reaction is upon the aromatic part or radical.

I have discovered that if the amount of alkali be greatly reduced in such fusions, and to below a critical quantity of about twice the amount required by theory for the reaction, while the fusion is carried out in the presence of an inert hydrocarbon diluent, there results a substantial increase in yield as well as a material saving in the amount of caustic. Further objects, features and advantages will more clearly appear from the detailed description below.

By way of example the invention will herein be particularly described in connection with the production of trans bisang 1—2 1'—2' dihydro-anthraquinone-azine, or what is known in commerce as indanthrene blue R.

I preferably carry out this fusion as follows: 40 kilos of beta amino-anthraquinone are suspended in about 220 kilos of an inert hydrocarbon diluent such as kerosene having a boiling point of 230° C. or thereabouts. This is then heated to 220° C. to 225° C. Then 30 to 35 kilos of caustic potash either in solid sticks or flakes are added, with or without 7.5 kilos of potassium nitrate as an oxydizing agent. Then the temperature is raised to about 230° C. and held there until the reaction is substantially complete which should be in about 25–30 minutes. The total time required for the fusion is usually about 45 minutes. The progress of the reaction can be noted as the orange color of beta amino-anthraquinone is changed to dark violet. After the fusion is complete it is cooled and the kerosene is removed from the fusion mass as by filtration. The product may be given a little after-wash with benzol and may then be worked up in any suitable manner. The order of the steps may be changed if desired. For example, the caustic potash may be first suspended in the kerosene and heated to 230° C. and then the beta-amino-anthraquinone gradually added to it.

In this fusion the most effective temperature of reaction is about 230° C. and it will be noted that a kerosene inert diluent is chosen which has a boiling point of about this temperature, whereby the temperature of the fusion is regulated and prevented from substantially exceeding the effective temperature of reaction. Also during the fusion water is formed by the reaction and this water is effectively carried away with the kerosene vapor and removed from the phase. This can be done by carrying out the fusion without a reflux condenser, or if a condenser is found desirable, a short reflux with a side water-jacketed condenser should be used. My experiments indicate that if the water is not removed, it deleteriously affects the yield of the desired product, and the fusion should be continued until substantially all the water is separated from the reaction phase. The amount of water collected in the side condenser is an excellent index of when the reaction is substantially complete.

It will be noted that in the above example the amount of beta amino-anthraquinone is given as 40 kilos while the amount of caustic potash employed therewith is only 30-35 kilos of 88-90% strength, which is only from about 130% to 152% of the amount of caustic required by theory for the reaction and less than twice the amount required by theory for the reaction. I find that by so reducing the amount of caustic much better yields are obtained as well as a substantial saving in alkali. I find that the large quantities of caustic heretofore used deleteriously affect the reaction probably on account of the considerable quantities of by-products produced by side reactions by reason of the great excess of alkali.

For inert diluent I may use any inert liquid hydrocarbon of suitable boiling point. Kerosene is a cheap liquid hydrocarbon diluent and a fraction of the desired boiling point can usually be obtained by simple distillation.

As another example I will describe the production of phenol from sodium benzene-sulphonate.

100 pts. of sodium benzene sulphonate of about 90% purity and 44-50 pts. of caustic soda (95%) are mixed together in a pot fitted with an agitator and a short head condenser. To this are added 600-700 parts of a petroleum fraction boiling between 330° and 360° C. All these are added and mixed in the cold and the cover of the pot fixed tight. The whole is then heated with agitation to the boiling temperature (i. e. about 340° C.) of the oil and held there for about 2 to 4 hours or until the oily distillate shows no traces of water.

The fusion should then be complete. The fusion mass may be separated from the diluent by filtration or centrifuging and the solid residue dissolved in water, filtered from insoluble matter and dirt and the clear filtrate acidified. Or the diluent and fusion mass may be dumped into water, the watery solution separated from the diluent, filtered and then acidified. The phenol separates and floats on the top as an oily layer. This oily layer may be again separated and distilled when pure phenol is desired.

It will be noted that in the above example only 44 to 50 parts of caustic soda (95%) are used to each 100 parts of the sodium benzene sulphonate, which is only about from 110% to 125% of the amount of caustic required by theory for the reaction.

Other phenolic bodies may be similarly produced from other aromatic sulphonic bodies, etc.

As a further example of the invention in its broader aspects, I will describe the production of an amino compound from para-dichlor-benzene.

3 parts by weight of para-dichlor benzene are mixed with 5 parts by weight of dry toluol, and to the mixture while in a flask or boiler, is slowly added 2 parts by weight of sodamid. This is about 126% of the amount required by theory. The addition is preferably made while the liquid in the flask is cold, for example the ordinary room temperature at the commencement of the operation, although the temperature may rise more or less during the addition of the sodamid due to the heat of the reaction. The mixture in the flask is preferably kept well agitated during the addition of the sodamid, the latter is preferably added in the form of a powder ground in the toluol.

The stirring is then continued and the mixture is heated slowly, up to the boiling point of the mixture, which will be approximately at the boiling point of the toluol acting as a reaction vehicle. By the use of such a vehicle, the reaction temperature is automatically maintained. The mixture, after heating is preferably kept at or near the boiling point for two or three hours, while stirring, either continuously or at intervals.

The reaction mixture is then cooled and is filtered to separate the toluene which was used as a reaction vehicle.

Alcohol is then added slowly to the residue of the filtration, to decompose the excess of sodamid present. This leaves the reaction mass of amino compound. The mass is then treated with a suitable acid, such as hydrochloric or sulphuric, preferably in a diluted condition which dissolves the amino compound, in the form of a salt, and the liquid is then filtered to remove insoluble impurities. The solution containing the salt of the amino compound is then worked up in the ordinary manner.

In some cases it is advisable to use a different reaction vehicle in place of toluol or kerosene. Benzol can be used, but on account of its low boiling point this is not so desirable. In some cases it is more advisable to use as the reaction vehicle, a hydrocarbon liquid having a higher boiling point than toluol.

The use of a reflux condenser in the above example, in which sodamid is used to react on dichlorobenzol, would be useful. With other examples, however, particularly where the alkali metal hydroxids are used as reacting materials and water is produced by the reaction, it is inadvisable to use a reflux condenser since the same would cause the condensation of water and the return of the same into the mixture undergoing the reaction. In such cases, however, it would be convenient to employ a short air-cooled reflux condenser with a side-water-jacketed condenser. By the use of such a device any water formed in the reaction will be readily removed from the mixture undergoing reaction, by the vapors of the hydrocarbon vehicle.

The filtration of the crude product of the fusion operation is a simple and highly advantageous mode of separating the reaction products from the reaction vehicle. The mass may be dumped into a centrifugal filter and spun to throw off the vehicle, or it may be dumped into a suction filter and sucked as dry as desired. It will be found, however, in most cases, that such operation will leave a slight film of the reaction vehicle upon the surface of and within the pores of each particle of the reaction product. Such film is frequently of importance as preventing ready access of air (including free oxygen, moisture or gases that might deleteriously affect the same) to the reaction product. For the above reasons the reaction product is more stable, by being sealed in such vehicle.

When one or more of the materials used in the process, or one or more of the products or by-products produced in the reaction is soluble in oil, the same may be found in the oil vehicle. Obviously in those cases where the primary product of the fusion is oil-soluble, the later treatment (i. e. the separation of the product from the oil) will be appropriately modified.

Many other changes and modifications may be made and the invention embodied in widely different forms without departing from the spirit and scope thereof in its broader aspects, hence I desire to cover all modifications and forms coming within the language or scope of any one or more of the appended claims.

What I claim as new and desire to secure by Letters Patent, is:

1. The improvement in substantially anhydrous alkali fusions which consists in reacting upon an aromatic radical of an organic compound with caustic alkali by fusing the compound with the alkali in the presence of an inert hydrocarbon diluent, the amount of alkali introduced into the fusion being less than about twice the amount required by theory for the reaction.

2. The improvement in substantially anhydrous alkali fusions which consists in reacting upon an aromatic radical of an organic compound with caustic alkali by fusing the compound with the alkali in the presence of an inert hydrocarbon diluent, the amount of alkali introduced into the fusion being less than about twice the amount required by theory for the reaction and the inert diluent being one which boils substantially at the temperature at which the reaction effectively takes place.

3. The improvement in substantially anhydrous alkali fusions which consists in reacting upon an organic compound with caustic alkali by fusing the compound with alkali in the presence of an inert hydrocarbon diluent and simultaneously removing the water evolved during the reaction by vaporization with the diluent that boils substantially at the temperature at which the reaction effectively takes place.

4. The improvement in the production of phenolic bodies which consists in fusing an aromatic sulphonic body with caustic alkali in the presence of an inert hydrocarbon diluent, the amount of caustic introduced being less than about twice the amount required by theory for the reaction of the caustic on the benzene sulphonate.

5. The improvement in substantially anhydrous fusions which consists in reacting upon an aromatic radical of an organic compound with caustic by fusing the same with caustic in an inert diluent, the amount of caustic introduced into the fusion being substantially one and one-half or less times the amount required by theory for the reaction.

6. The improvement in substantially anhydrous fusions which consists in reacting upon an aromatic radical of an organic compound with caustic by fusing the same with caustic in an inert diluent, the amount of caustic introduced into the fusion being substantially one and one-half or less times the amount required by theory for the reaction, and the inert diluent being a hydrocarbon diluent which boils substantially at the temperature at which the reaction effectively takes places.

7. The improvement in the production of phenol which consists in fusing a benzene sulphonate with caustic alkali in the presence of an inert hydrocarbon diluent, the amount of caustic introduced being less than about twice the amount required by theory for the reaction of the caustic on the benzene sulphonate, and the inert diluent being one which boils substantially at the temperature at which the reaction effectively takes place.

8. The improvement in the production of phenol which consists in fusing a benzene sulphonate with caustic alkali in the presence of an inert hydrocarbon diluent the amount of caustic introduced being less than about twice the amount required by theory for the reaction of the caustic on the benzene sulphonate, the fusion being continued until substantially all water produced by the reaction is separated from the reaction phase.

9. The improvement in the production of phenol which consists in fusing a benzene sulphonate with caustic alkali in the presence of an inert hydrocarbon diluent, the amount of caustic introduced being less than about twice the amount required by theory for the reaction of the caustic on the benzene sulphonate, and the inert diluent being one which boils substantially at the temperature at which the reaction effectively takes place, the fusion being continued until substantially all water produced by the reaction is separated from the reaction phase.

In testimony whereof I have signed my name to this specification.

VAMAN R. KOKATNUR.